Patented Oct. 29, 1946

2,410,219

UNITED STATES PATENT OFFICE 2,410,219

PIGMENT OR DYESTUFF AND METHOD OF MAKING THE SAME

Theodore A. Langstroth, Montclair, N. J., assignor to Sun Chemical Corporation, a corporation of Delaware No Drawing. Application December 22, 1942, Serial No. 469,824

14 Claims. (Cl. 106—289)

This invention relates to a process for manufacturing improved azo pigment dyestuffs, and to the products produced therefrom, and more particularly to the coupling of azo compounds with methylenic type coupling components.

One of the principal objects of the present invention is to provide a method for coupling azo compounds with methylenic type coupling components, which is greatly superior and more efficient and effective in operation and which will yield improved pigment dyestuffs of heretofore unattainable characteristics.

Another object is to provide such a process which will produce pigment dyestuffs of greatly superior strength and new and more desirable shade as hereinafter specified.

Another object of the invention is to provide such a method of coupling in which the azo compounds and the developer material are brought together under conditions of controlled reaction such as to insure that they will react with each other as brought together in the proper reacting proportions to give maximum yield of the pigment dyestuff of said very superior characteristics.

Another object of the invention is to provide a coupling process of the character described which permits of such control that predetermined characteristics may be attained in different commercial batches so that superior characteristics of the end product, or ready matching of a standard product, may be secured by the user to meet the requirements of the consumer.

A still further object is to provide improved pigment dyestuffs of the greatly superior or novel characteristics described.

Another object is to provide a method of treating such dyestuff so as to retard or prevent its degradation or deterioration and maintain its superior characteristics substantially unimpaired.

A still further object is to provide such pigment dyestuffs of the character described which will maintain such high superiority for commercial usage even after heating or when stored over long periods of time, under conditions which would be destructive for other dyestuffs of commercial types heretofore made available.

Other objects and advantages of the invention will be apparent from the specification and appended claims.

Organic pigments comprise a very important class of coloring materials of great value in industry, as for example in the manufacture of coating compositions such as paints and printing inks. To be most effective in printing inks and in coating compositions such as paints, and to permit of especial quality, pleasing and adequately permanent appearance of the printed or painted object and capacity for faithful reproduction or matching of shade, appearance and so forth, the pigments utilized should have good working properties for the intended field of processing and use, great tinctorial strength as well as desirable cleanness, shade and transparency. For example, good working properties means that the pigment properties are such that the pigment particles are easily wetted by the vehicle utilized—so that the pigment may be readily and properly and economically incorporated in the composition in which it is to be employed, as by milling or grinding. Tinctorial strength is important since the amount of coloring material utilized for a particular composition such as a printing ink is in general inversely proportional to its tinctorial strength and covering power. Thus, the higher the tinctorial strength, or as it also is termed the color strength the less coloring agent will be necessary for a particular desired effect in the final product. Other equally important properties include ability to withstand heating at moderately severe temperatures, say of the order of 65–75° C., the temperatures ordinarily employed in the dry boxes of the pigment industry, without objectionable degradation of color or tinctorial strength and without objectionable change in desired shade, and resistance to objectionable degradation of color strength or change in shade on storage for long periods, as for example six months.

I now have found that improved pigment dyestuffs can be produced according to my invention from azo compounds and methylenic coupling components, and further, that such pigment dyestuffs are characterized by good working properties, great tinctorial strength as well as desirable cleanness, shade, and transparency, and that such improved properly treated pigments are extremely resistant to objectional degradation of tinctorial strength and objectionable change in desirable shade on heating or on storage for long periods, as herein described.

In measuring the tinctorial strength, cleanness, and shade of pigments, such as is customary with commercial pigments, standards of color strength, cleanness, and shade have been arbitrarily adopted, based on the values usually attainable by the sources of supply in past practices. Thus, for example, standards of color strength, cleanness and shade have been adopted necessarily dependent upon the characteristics of the pigments heretofore produced from azo compounds and methylenic coupling components. Among such pigments are those designated as Dichlorbenzidine Yellow, Hansa Yellow G and Hansa Yellow 10G.

When pigment dyestuffs are produced according to my invention from reaction of the same azo component and the same methylenic coupling component as are utilized in preparing pigments such as the referred to Dichlorbenzidine Yellow and Hansa Yellows, I find that my pigment dyestuffs are of heretofore unattained greatly increased strength and of such desirable shade and cleanness of color, and are characterized by such unusual resistance to degradation of strength and change in shade on being heated or on storage for long periods of time as herein described when compared to the known commercial standards for such types of pigments that my pigment dyestuffs may well be characterized as new instead of as improved pigment dyestuffs. Further, I have found that such new and improved pigment dyestuffs may be made according to my invention so that economy of manufacturing and uniformity of product of predetermined characteristics in successive or different batches is effected.

While it is not now known with certainty why pigment dyestuffs of my invention are of such tremendously superior characteristics when compared with known commercial types of pigments referred to, the theory which I believe to be true is that in preparing the pigments dyestuffs of my invention, I have effected by careful control of conditions of reaction as herein described, substantially complete interaction of all of the azo component with all of the methylenic coupler component. In other words, I have brought about coupling in such a way as to cause effective interaction of each and every reactive azo unit or particle with a reactive methylenic coupling component unit or particle to produce coupled particles with the desired light reflectance—and further, that the coupled particles or pigment dyestuffs particles of my invention are substantially pure and free from any unreacted or degraded components or other extraneous material. Also it is believed that the coupled particles of my invention as formed have a chemical or physical structure or geometric design which is of unusual character and which differs from the chemical or physical structure or geometric design of previous pigment dyestuffs, prepared from the same azo compounds and coupling components.

But, whatever the theory, I have discovered that when an azo component is brought into correct reacting admixture with a methylenic coupling compound under carefully controlled predetermined conditions as herein described, that a pigment dyestuff is produced which is markedly superior in its characteristics, e. g., its strength, its desirable shade, and its cleanness of color when compared to known commercial pigments prepared by reacting such components and that the properly treated pigment dyestuffs of my invention are extremely resistant to objectionable degradation of superior characteristics on heating or on storage for long periods.

In practicing my invention, I bring an azo solution and a coupler solution together in proper molecular proportions and without neutralization or precipitation of a coupler suspension so that the coupling reaction proceeds to give maximum reaction yields of my new and improved pigment dyestuffs. In the preferred method of practicing the invention as herein set out, I simultaneously introduce concentrated aqueous solutions of my coupling components without neutralization of the developer into a reaction bath in which the concentration of the reactants, and the pH value of the bath are maintained within a predetermined controlled range during the entire course of the reaction and introduce the coupling components so that they admix in equivalent or proper reacting proportions to cause all the reaction to take place under optimum conditions as they are thus admixed. I prepare my reaction bath to contain a quantity of water varying in proportion to the size of the batch to be prepared. The amount of water should be kept low, and concentrations of coupling components high to save valuable reaction space. The practicing of this invention involves bringing into contact, in a reactive state, the two reaction components in such manner that effective, complete, coupling is assured, and further accomplishing such an object by means which are practicable in commercial operations from an engineering and economic viewpoint. For example, the water in the reaction bath at the start of the reaction may be roughly one fourth the volume of the solution of either of the reactants, i. e. one tenth of the total reaction volume. This bath is acidified to the predetermined pH and is acid to prevent decomposition of the azo component, and yet is at a pH at which there is no objectionable precipitation of the developer from solution—that is at a pH at which, although acid, the developer has a fair degree of solubility. This pH is maintained substantially constant by a suitable buffer salt.

The coupling components as thus admixed when introduced into the bath unite and couple almost instantaneously to form the solid pigment dyestuff, which separates out of solution. Consequently, the concentration of the reactants in the reaction bath can thus be maintained substantially constant during the whole operation, and the desired results attained as the reaction proceeds by thus maintaining a desired low concentration throughout the process.

Likewise a change in pH which would otherwise occur due to the addition of the alkaline developer component is avoided by this immediate coupling. By buffering the reaction bath at a predetermined pH, the desired reaction acidity is maintained substantially constant at the predetermined pH as herein described throughout the coupling operation.

The admixture and reaction of the components in proper molecular proportions and control of concentration and acidity during reaction results in the formation of a product having the greatly superior qualities referred to and in yields which closely approach the theoretically obtainable yields, and produces a uniformly high quality product, with such product characteristics readily reproduceable in manufacturing operations.

Satisfactory results in the commercial practicing of my invention are attained when the reaction bath is provided with a quantity of water as described, and is maintained at a pH below approximately 5.0 during the entire coupling reaction and preferably between 3.5 to 4.3, to secure satisfactory commercial operations. If the pH is above 5.0, the color obtained is brownish and dull, instead of the bright clear shade obtained at the proper pH. The azo solution and the developer are prepared in approximately equivalent molecular proportions, and are added to the coupling bath at such a rate with respect to each other as to be furnished for reaction in equivalent reacting proportions, and at such a rate with respect to the quantity of water in the reaction vessel, that they will react substantially instantaneously, and thus maintain satisfactorily constant the relative reactive concentrations and avoid adverse change in the effective acidity of the reaction mixture.

If such solutions as described are added to the reaction vessel in equivalent molecular proportions, the coupling will proceed effectively to produce the high yields and improved product of my invention. However, if there should be excessive azo component the yields will be lowered, and the product inferior. I have, therefore, found it desirable to maintain a slight excess of the developer material in the bath at least during the early stages of the reaction as such excess of this material does no harm and insures at least the proper equivalent of the developer to completely satisfy all the azo material as introduced. This excess in the commercial operation herein described can be satisfactorily any amount up to about 20% of the total charge of developer but the developer being in alkaline solution, the pH of the reaction bath should not be upset and brought to a point above the pH at which a satisfactory product results—and very satisfactory results are attained with an excess between 10 and 15 per cent, with the commercial reaction concentrations referred to. Moreover, the developer is only slightly soluble at the pH of the bath, and hence the addition of larger quantities causes precipitation and consequent loss of developer.

Furthermore, the addition of larger quantities of developer would raise the concentration of the total reactants in the bath to a point too high to produce the advantages of a low concentration coupling. I have found that if the concentration of reactants in the reaction bath is maintained at about 2% or below, that good results are obtained.

In preparing the reacting solutions, the free base or acid salt thereof, from which the azo component is to be formed, is dispersed in water, solubilized by acid and heated to boiling until complete solution is obtained. The solution is allowed to cool slowly to about 50° C. and then rapidly cooled as with ice to about 0° C. On cooling, additional acid is added to maintain the acidity during subsequent azotization and to react with the $NaNO_2$. The azotization may be carried out in a known manner, for example, by the addition of sodium nitrite, maintaining the solution at approximately 0° C., during the reaction.

The methylenic developer is dispersed in water and is dissolved with the aid of an alkali such as sodium hydroxide. After complete solution it is diluted with water and cooled as with ice to 0° C.–20° C.

The coupling process is carried out in the separate vat, with the pH maintained at a predetermined level below approximately pH 5.0, and preferably between 3.5–4.3 as stated. The vat is first provided with an acid such as acetic acid, and an acid salt such as sodium acetate is added which acts as a buffer to maintain the pH at the desired level during coupling. The acid solution in the coupling vat is also brought to 0° C. which temperature should be maintained until the completion of the coupling reaction, and sufficient water is added to insure the low concentration throughout the reaction.

Now with all of the solutions ready, the initially added small proportion of the methylenic developer is run into the coupling vessel. Then both solutions—azo compound and developer— are introduced into the coupling bath simultaneously in small streams in approximately equivalent reacting proportions to admix promptly, which may be caused by maintaining good agitation until the respective coupling solutions are exhausted. If part of the developer solution is introduced first into the reaction bath, introduction of this reactant will be completed slightly before the azo solution has all been added. The remaining azo component run in will couple with this excess and agitation likewise should be continued until completion of the coupling reaction. The temperature of the bath is maintained at 0° C. or within a few degrees thereof during coupling, and completion of the coupling is indicated when the well known "spot" test on white filter paper gives no colored bleed. The rate of introduction of the coupling components should be slow as described and coupling should be caused to proceed at a predetermined constant rate. If the reactants are introduced too quickly, they do not have time to react properly with each other and the dangers of high concentrations described above are encountered. On the other hand, the addition of reactants should not be so slow as to adversely affect any of the components nor unduly retard or hold up production. I have found that with the components for commercial operations as herein described, a total coupling time of about 1 to 1½ hours is satisfactory in most cases regardless of the size of the batch, and permits the substantially complete reaction without adverse deterioration of any component.

Extreme care should be taken when adding the first portion of developer solution to the coupling bath. It should be done slowly with good agitation, so as to make certain that none is precipitated out of the solution. (The developer is only slightly soluble at this pH.) The developer once out of solution in the coupling bath retards the coupling with the azo compound, and as a result the yield of the dyestuff is low and strength is sacrificed. The total coupling time is important. Too rapid addition of the coupling components either throws the developer out of solution or the azo solution is exposed to decomposition before having a chance to couple. The best control for the most efficient coupling is for the operator to make successive spot tests on white filter paper. If a decided bleed is observed, it is an indication that the azo compound is in excess. As long as the developer solution is in excess of the azo solution during the first 45 minutes of coupling, a good reaction may be expected. A clear white spot test on filter paper, when touched with a drop of azo solution, giving an intense colored reaction, is an indication that the developer solution is in excess.

After the coupling reaction has thus been carried out, the temperature is raised to approximately 60–65° C., and the formation of the pigment of the high strength and clear color described is thus completed. The pigment may be filter pressed, washed and dried in the usual manner either by air drying or with gentle heat.

However, in the case of many of these dyes, heating of the pigment or even storage after air drying, causes them gradually to lose their strength, and to develop an undesirable reddish or brown color with lack of cleanness. When this occurs the advantages of the new process are decreased to the extent of the degradation and color change experienced.

I have found that if the pigment is subjected to proper resination after its completed formation as will be described hereinafter, this change is prevented and the pigment will retain high strength and its original shade even upon heating to 65° C., or above, or upon storage for prolonged periods of time.

The resination is preferably carried out in the coupling bath immediately after coupling and heating. At this point the pH is below 5.0 as described above. Resination according to this invention is most advantageously carried on at a pH not below about 6.5. Accordingly the pH of the bath after coupling is now raised to about 6.5, for example, by the use of caustic. Then, a solution of a resin which will be finely dispersed in the bath is added thereto. Very satisfactory results are secured when rosin dissolved or finely dispersed in alkali, and a precipitant therefor, such as aluminum sulfate solution are added under conditions controlled to form the protective covering or film of resinate about the pigment particles, such being readily accomplished in the practical operations by thorough inter-reactive admixture such as caused by stirring or agitation. Under such conditions adequately protective resination of the pigment particles readily occurs and agitation for a short period of several minutes is sufficient to complete this particular resination, and in commercial practice stirring is carried on for about fifteen minutes to insure completion. The minimum admixture period may vary somewhat for different conditions, but an adequate period may be readily determined by experience. As described, this condition is indicated when the final pH is about 6.5. If alumina hydrate, in amount between 1 and 100 per cent of the amount of resinate is also present in the bath as resination is effected, even more complete protection of the pigment particles to maintain the inherent superior characteristics and to prevent degradation is secured. And, also, the presence of the alumina hydrate either increases the inherent superior characteristics of the pigment particles, or at least makes those inherent characteristics more apparent in use—although the reason why this is so is not completely understood at present. And it has been found that alumina hydrate can be added to the reaction bath before the coupling, with proper adjustment to keep within the desired pH range and that it will be available for resinating of the pigment particles; or it may be added to the bath after coupling reaction is completed but before the resinating components above referred to are added. After resination, the resinated pigment is ready for filter-pressing, drying, and use. When treated as described above, such pigment dyestuff will withstand conditions heretofore considered impossible without undergoing any substantial change, for example, they will withstand such severe tests as keeping the pigment at a temperature of 65° C. (149° F.) for two weeks, in fact some pigments withstanding even higher temperatures of the order of 90° C. Also, storage of the resinated pigment for six months results in almost inappreciable loss of strength, e. g., less than 5%, and in no perceptible change in shade and cleanness.

The process of my invention is applicable to, and produces greatly improved colors whenever coupling is effected between azotized components and coupling components or developers containing a methylenic group. A methylenic group is a $CH_2$ group so situated in a molecule, that both hydrogens are highly reactive and can be readily replaced, a typical case being one in which the $CH_2$ group is adjacent to a $C=O$ group. The hydrogens of the $CH_2$ group are called tautomeric hydrogens and the methylenic system may exist in either or both of two tautomeric forms, that is, the keto form and the enol form either of which may change to the other form. The coupling of the azo compound usually takes place at this reactive group.

This potentiality of the methylenic compounds of existing in two such different forms, may be responsible for the degradation of the unprotected pigment as upon heating or storage, which in such pigments can result in great decrease in strength and change in color. It is not clearly understood now why this degration in pigments of this type occurs. One theory which may well be correct is that change from one tautomeric form to the other in the pigment as formed is accompanied by degradation of strength and color, and that the degradation merely indicates the extent of such progressive change. An alternative theory is that degradation is caused by a building up or growth of the crystals after formation and during heating or storage and that the resulting crystals give the markedly different strength and color. But, whatever the theory, it is a fact that degradation occurs, and it is especially objectionable with a pigment of high strength and clean color such as produced by this method. Also it is not now definitely understood why this pigment when properly resinated maintains its strength and shade, but seemingly the resination, in some way, prevents this change, perhaps by preventing intermolecular migration to another tautomeric form, or by preventing objectionable crystal growth or change in crystal form. In any event proper protection as by such resination maintains the pigment-dyestuff against objectionable degradation.

Examples of the satisfactory production of commercial pigments according to my invention using different azo compounds, and different methylenic type coupling components to give new and improved pigments of color strength greatly exceeding the commercially adopted standard and also of shade and cleanness of color much superior to and much more desirable than the known commercial pigments, are given below:

EXAMPLE I.—PREPARATION OF A DICHLORBENZIDINE-ACETOACETANILID YELLOW

*a. Preparation of tetrazo solution*

46 parts of dichlorbenzidine hydrochloride of 45% amino content are stirred vigorously in a beaker with 450 parts of water. 49.6 parts of hydrochloric acid are added and the temperature is decreased as by the addition of ice to 0–3° C. To this is added rapidly and with good agitation 12.2 parts of sodium nitrite dissolved in 60 parts of cold water. In addition ice is added, or refrigeration used, to maintain the temperature at approximately 0° C. during tetrazotization. About a half hour will complete the tetrazotization, when a positive test to both Congo and starch iodide papers will be given. 14.5 parts of sodium acetate is then added and stirred for five minutes and the entire solution is made up with ice and water to a temperature of 0° C. and volume of 800 parts.

b. Preparation of acetoacetanilid solution 33 parts of acetoacetanilid are dissolved in 200 parts of water containing 8 parts of caustic soda. After complete solution is obtained it is diluted with water to a total volume of 800 parts at a temperature of 0° C.

c. Coupling

The coupling bath is prepared by dissolving 29 parts of sodium acetate in 200 parts of water containing 24.8 parts of 70% acetic acid and bringing the temperature to 0° C. Then 15% of the total of the acetoacetanilid solution is run into the coupling vessel in a slow stream with good agitation. Concomitantly with the addition of acetoacetanilid the tetrazo solution is introduced into the coupling bath at a rate equal to that of the acetoacetanilid. Both solutions are run simultaneously into the coupling bath so as to effect intimate admixture and prompt effecting of the reaction, and this is continued until the reaction is complete. The entire time of coupling requires about an hour. All solutions are maintained at about 0°-3° C. during coupling. After the coupling reaction has thus been carried out, the temperature is raised to approximately 60-65° C. and the formation of the pigment of the high strength and clean color described is completed.

A yield of substantially 100% of pigment based on the theoretically obtainable amount is obtained. After filtering the pigment is then dried under conditions carefully controlled to avoid degradation, for example, satisfactory results are attained by drying with humid air at room temperatures and the strength of the color when produced as described and so dried will be of the order of 40% stronger than the best prevailing commercial dichlorbenzidine yellow pigment product when measured by the standard "draw down" test in linseed oil as hereinafter described. Its shade is cleaner and a more desirable greener shade.

EXAMPLE II.—PREPARATION OF A HANSA YELLOW G TYPE YELLOW a. Diazotization 15.2 parts of ortho-nitro-para-toluidine are added with agitation to 300 parts of water containing 7.5 parts of sodium nitrite. Sufficient ice is added to reduce the temperature to 0° C. and 26 parts of hydrochloric acid, 20° Bé., are added rapidly. This is well agitated until complete solution is obtained, the temperature being maintained at 0° C. during the agitation as by the addition of ice. It requires about a half hour to an hour to obtain complete solution, at the end of which time a positive test to starch iodide and Congo paper is evident and the diazo solution is ready for coupling after the solution has been made up to a volume of 600 parts with water.

b. Preparation of acetoacetanilid solution 17.8 parts of acetoacetanilid are dissolved in 200 parts of water containing 4.5 grams caustic soda maintaining the temperature below 35° C. The solution is diluted with water to 600 cc., the same volume as the diazo solution, and is brought to a temperature of 0° C.

c. Coupling

The coupling bath is prepared by dissolving 16 parts of sodium acetate in 200 parts of water and brought down to and maintained at 0° C. To this is added 12 parts of 70% acetic acid. The coupling reaction is carried out in the following manner: First, 10% of the total of the acetoacetanilid solution is run into the coupling bath in a small stream. At this point the diazo solution is introduced and this is run in simultaneously with the remainder of the acetoacetanilid solution at a speed such that the reaction requires about one hour. The temperature then is raised to 60-65° C. to complete the formation of the pigment. This pigment when produced and air-dried as described is tremendously superior in cleanness to the best prevailing commercial Hansa Yellow G product which could be purchased in 1942 and is much greener in shade and more transparent when tested by the standard drawn down test in linseed oil, and is of the order of 100 per cent stronger, as hereinafter described.

EXAMPLE III.—PREPARATION OF A HANSA YELLOW 10G TYPE YELLOW a. Diazotization 8.6 parts of para-chloro-ortho-nitraniline are mixed with 200 parts of water containing 3.6 parts of sodium nitrite. Sufficient ice is added to reduce the temperature to 0° C. and 24 parts of hydrochloric acid, 20° Bé., are added. This is well agitated until complete solution is obtained and the temperature is maintained at 0° C. It requires about 1½ hours to complete diazotization and solution after which the solution is made up to a final volume of 400 parts.

b. Preparation of acetoacetchloranilid solution 10.6 parts of acetoacetchloranilid are dissolved in 200 parts of water containing 4.5 parts of caustic soda maintaining the temperature under 30° C. This is diluted with water and brought to the same volume as the diazo solution, (400 parts) at a temperature of 0° C. preparatory to coupling.

c. Coupling

The coupling bath is prepared by dissolving 25 parts of sodium acetate in 200 parts of water at 0° C. To this is added 6 parts of 70% acetic acid. The coupling reaction is carried out in the following manner: First, 10% of the total acetoacetchloranilid solution is run into the coupling bath in a small stream. At this point the diazo solution is introduced and this is run in simultaneously with the remainder of the acetoacetchloranilid solution at a speed such that the acetoacetchloranilid component is slightly in excess of the diazo component during all but the final stages of the reaction, which requires about an hour. When incorporation of the components is thus completed, the temperature of the mixture then is raised to 60-65° C., to complete the formation of the pigment of high tinctorial strength and clean shade. This pigment, when dried as described, is of the order of 50 per cent stronger, and is more transparent than the best prevailing commercial Hansa Yellow 10G pigment available for purchase in 1942, when tested as described.

To secure satisfactory and lasting results in protecting the pigment by resination against degradation, the application of the protecting agent must be so accomplished that all, or substantially all, of the pigment is adequately so protected, as the unprotected pigment will be very susceptible to change as pointed out. As described very satisfactory and substantially complete protection is secured when resination is carried out in the coupling bath as described above. An example of such resination which has been satisfactorily carried out in commercial operation in the production of a so resinated dichlorbenzidine yellow is sufficiently illustrative.

EXAMPLE IV.—RESINATION OF DICHLORBENZIDINE-ACETOACETANILID YELLOW

Dichlorbenzidine-acetoacetanilid yellow prepared as described in Example I and while still in the coupling bath, is treated with caustic soda solution until the pH of the mixture is raised to approximately 6.5. At this point 8.8 parts of alumina hydrate are added and 8.8 parts of water white rosin dissolved or dispersed with two parts of caustic soda in sufficient water to yield a 5% solution or dispersion of sodium resinate are added, and the mixture agitated to effect adequately complete admixture of the resinate material with the pigment dyestuff particles. Finally 3 parts of aluminum sulfate dissolved in 30 parts of water are added. The mixture is stirred for several minutes as described, filtered, and the portion remaining on the filter washed with cold water. The washed material comprises resinated dichlorbenzidine yellow of such characteristics that it will undergo, without observable change in strength or shade, such a severe test as subjecting it to a temperature of 65° C. for a period of two weeks. Even upon storage of the resinated pigment for as long as six months, it has been found to suffer as a maximum a loss of strength of less than 5%, and no perceptible change in shade.

EXAMPLE V.—PREPARATION OF A DICHLORBENZIDINE-PHENYL METHYL PYRAZOLONE YELLOW

*a. Tetrazotization*

8.28 parts of dichlorbenzidine are agitated in a reaction vessel with 100 parts of water. 10 parts of hydrochloric acid (20° Bé.) are added, and the temperature of the agitated mixture raised until boiling of the mixture occurs. The mixture then is allowed to cool to approximately 50° C. The temperature then is decreased to 0° C., at which point it is maintained during subsequent tetrazotization. 10 parts of hydrochloric acid (20° Bé.) and 5 parts of sodium nitrite then are added to the cooled mixture, and the whole agitated for approximately ½ hour. 5 parts of sodium acetate and 9 parts of 70% acetic acid then are incorporated, and the mixture then is diluted to a volume of 400 parts at 0° C.

*b. Preparation of phenylmethylpyrazolone solution*

12.8 parts of 1-phenyl-3-methyl-5-pyrazolone are dissolved in 200 parts of water containing 3.25 parts of caustic soda. After complete solution is obtained it is diluted with water to a total volume of 1500 parts at 0° C., and the pH of the solution adjusted to 6.5.

*c. Coupling*

The coupling bath is prepared by dissolving 12 parts of sodium acetate in 200 parts of water containing 15 parts of 70% acetic acid and bringing the temperature to 0° C. Then 15% of the total of the 1-phenyl-3-methyl-5-pyrazolone solution is run into the coupling bath in a slow stream and with good agitation. At this point the tetrazo solution is introduced into the coupling bath at a rate equal to that of the 1-phenyl-3-methyl-5-pyrazolone. Both solutions are introduced into the coupling bath simultaneously at a speed such that the coupling requires about one hour. The temperature then is raised to 60–65° C. to complete the formation of the pigment.

This pigment when produced and air-dried as described is a brilliant reddish yellow. All known prior commercial pigment products secured from dichlorbenzidine and 1-phenyl-3-methyl-5-pyrazolone are of an entirely different shade of color, being orange in color. Therefore, it is not practically possible to compare, on the basis of tinctorial or color strength, my new pigment with any of the known commercial products prepared from the same azo compound and methylenic coupling component as my pigment dyestuff.

Further, I have found that this new pigment dyestuff when adequately completely protected by resination, which is substantially the same as herein described for the dichlorbenzidine-acetoacetanilid coupled product will withstand without change in strength or shade such a severe test as for example, subjecting the pigment to a temperature of 65° C. (149° F.) for two weeks or storing of the so resinated pigment for six months.

If the dichlorbenzidine-1-phenyl-3-methyl-5-pyrazolone coupled product secured as described and without an adequately complete protective resination, as for example, the product as obtained at the end of the coupling reaction is filter-pressed and then dried, as for example, in a so-called "dry box" at 60° C. (140° F.), a pigment is secured which is comparable in shade to known commercial products of this type but which is of the order of 40% stronger than the best known commercial products secured from dichlorbenzidine and 1-phenyl-3-methyl-5-pyrazolone.

The practical man in industry, for example, the printing ink maker, will usually determine the character of a pigment as to its strength, shade, and cleanness by preparing a dispersion probably the equivalent of a printing ink actually used, and making a so-called drawn-down in comparison with other drawn downs from previously used inks or a prepared standard, whereby a basis of comparison is secured which permits of correctly formulating the ink to give a desired result in printing. One way of determining relative strength is to admix diluting or extraneous pigments with the pigments of this invention in an ink so that the color strength, shade and cleanness will match the color strength, shade, and cleanness of an ink containing a commercial pigment sold for comparable purposes and of the same general types. For example, in order to thus compare the Hansa Yellow G type yellow pigment of Example 2 above with the best available Hansa Yellow G type of pigment commercially available—i. e., that known as Lithosol Fast Yellow HN Powder sold by E. I. du Pont de Nemours & Co., Inc., it was found necessary to add such quantity of added materials based on applicant's Hansa Yellow G type yellow that the matching inks contained the following:

*Ink #1*

| | Pounds |
|---|---|
| Lithosol Fast Yellow HN Powder | 25 |
| #2 Linseed oil varnish | 75 |
| | 100 |

Ink #2

| | Pounds |
|---|---|
| Hansa Yellow G type yellow of Example 2 | 12.5 |
| Chrome orange pigment | 2.1 |
| #2 Linseed oil varnish | 68.4 |
| Alumina hydrate | 8.0 |
| Zinc sulfide | 9.0 |
| | 100.0 |

From this it is evident that approximately equal parts of applicant's pigment of Example 2 and of these added extraneous materials were required in order to give a composite substantially equivalent in strength or covering power to the commercial Hansa Yellow G type pigment referred to; that is, approximately one-half as much of applicant's pigment of Example 2 admixed with other materials would give the same effect in use as twice as much of the commercial Hansa Yellow G type pigment referred to; in other words, applicant's pigment of Example 2 is approximately 100 per cent stronger than the commercial pigment referred to. The relative strength can be determined in the same way by comparison with other commercial pigments, and in all of the pigments of applicant's invention very large increases in color strength differing somewhat for each of applicant's types of pigments described are secured, but all of them show astonishingly improved characteristics over all other commercial pigments known to applicant and sold for the same uses. In fact the shade of all the yellows except the Hansa Yellow 10G type is so pronouncedly on the green side that it is difficult to mix them with diluting pigments which will cause them to exactly match in shade the red shade yellows heretofore produced and also cause them to match such red shade yellows in color and cleanness. In addition to the above test which is one which may be readily performed by skilled technicians in industry and which is the usual practice, the remarkable increases in the characteristics of strength, cleanness, and shade may be readily determined with great technical accuracy by the well-known recording spectrophotometric test. As well understood in such tests shade as heretofore used is determined in terms of dominant wave length (λ), cleanness in terms of purity, and strength in terms of reflectivity. The scientifically accurate tests thus conducted corroborate and properly compare with the more common industrial tests above referred to—and under such spectrophotometric method of testing the strength of various pigments made according to the several examples above set out with the commercial pigments referred to are approximately as follows:

The Hansa Yellow 10G type yellow of Example III is approximately 50 per cent stronger than the Hansa Yellow 10G pigment sold by Zinsser and Co. The phenylmethylpyrazolone yellow of Example V and unresinated is approximately 40 per cent stronger than YB-3 Yellow pigment, sold by Harmon Color Works, Inc.

While the products herein described and the methods of producing the same constitute preferred embodiments of the invention, it is to be understood that the invention is not limited to these precise products and methods and that changes may be made therein without departing from the scope of the invention which is defined in the appended claims.

What is claimed is:

1. The method of coupling an azo compound with a methylenic coupling component to provide a pigment of clean color and high tinctorial strength, which comprises preparing a high concentration solution of the azo and a high concentration solution of the coupling component in relatively controlled molecular proportions, preparing an aqueous reaction bath having an acid pH into which said coupling components are to be added and having such constituency as to remain of substantially constant acid pH below about 5.0 throughout the reaction period, and introducing said components at a controlled rate and in equivalent reacting proportions into said reaction bath and maintaining the concentration of the components in the reaction bath below about 2% and causing intimate reacting admixture of said components as introduced, and continuing such controlled introduction of the components until substantially complete inter-reaction of both components is effected.

2. The method of producing a pigment by coupling an azo component with a methylenic coupling component which comprises feeding the two components each in solution simultaneously into a reaction bath in controlled reacting proportions while maintaining the concentration of the components in the reaction bath below about 2% and the pH of the reaction bath below about 5.0 and intimate reacting relationship of the reactants in the bath to cause substantially complete reaction of the components and without interfering precipitation or reaction of either component.

3. The method of producing a pigment by coupling an azo component with an methylenic coupling component which comprises feeding the two components each in solution simultaneously into a reaction bath at a pH below about 5.0 in controlled molecular proportions, controlling the rate of feeding of the reactants so that the methylenic component is present in the bath in excess not greater than about 20% of the azo component during the major part of the course of the reaction, maintaining the concentration of the components in the reaction bath below about 2%, and effecting and maintaining intimate reacting relationship of the reactants in the bath during the reaction period.

4. The method of producing a pigment by coupling an azo component with a methylenic coupling component, which comprises preparing concentrated solutions of the individual components, preparing an aqueous reaction bath at a pH below about 5.0, and simultaneously introducing the solutions of components into said reaction bath at a substantially equimolecular predetermined rate to maintain the concentration of the components at a predetermined low level in the bath, and effecting and maintaining intimate reacting admixture of the reactants in the bath during the reaction period.

5. The method of producing a pigment by coupling an azo component with a methylenic coupling component which comprises preparing concentrated solutions of each component, preparing an aqueous reaction bath having a pH below about 5.0 starting the feeding of the developer component into said reaction bath to produce a limited concentration thereof in the bath of not more than 2%, then starting the feeding in of the azo component and thereafter simultaneously introducing the separate components into the bath reaction zone in equivalent reacting proportion and controlling the rate of introduction thereof and effecting and maintaining such intimate admixture thereof in the bath reaction zone as to insure complete reaction until the developer solution has been completely added, and then adding the remainder of the azo component.

6. The method of producing a pigment by coupling an azo component with a methylenic coupling component which comprises preparing an acid coupling bath in volume controlled according to the amount of components to be added thereto and having pH below about 5.0 and buffered to maintain said pH during coupling reaction, preparing an acidic azo solution and an alkaline solution of a methylenic coupling component, adding initially to the acid bath a small proportion of the methylenic coupling component, then starting the feeding in of the azo component and thereafter slowly adding azo solution and methylenic coupling component solutions simultaneously in equivalent reacting proportions to the acid coupling bath while maintaining the pH of the coupling bath below about 5.0 throughout the coupling reaction, and maintaining intimate reacting relationship of the components in the bath during the reaction period.

7. The method of coupling a tetrazotized benzidine derivative with a methylenic coupling component according to the process as set forth in claim 6.

8. The method of producing a pigment by coupling tetrazotized dichlorzenzidine with acetoacetanilid which comprises feeding the two components each in solution simultaneously into a reaction bath in controlled reacting proportions, maintaining the pH of said bath throughout the coupling below about 5.0 and effecting and maintaining intimate reacting relationship of the reactants in the bath to cause substantially complete reaction of the coupling components, and without interfering precipitation or degradation of either component during the reaction period.

9. The method of preparing a pigment dyestuff of high tinctorial strength and capable of maintaining said strength substantially undiminished under adverse conditions equivalent to heating to 65° C. for two weeks or storage for periods as long as six months, which comprises preparing solutions of an azo component and of a methylenic developer component of relatively controlled reacting proportions, preparing a reaction bath in volume controlled according to the amount of components to be added thereto and comprising an aqueous acid solution buffered to maintain a pH below about 5.0 throughout the coupling reactions, simultaneously introducing azo solution and developer solution into said reaction bath, and effecting and maintaining intimate reacting relationship of the reactants to cause substantially complete reaction of the components, thereafter raising the temperature of the reaction bath to approximately 60-65° C., thereafter raising the pH in the bath with its contained coupled material to about 6.5, adding a resin solution and a precipitant component reactive with the resin to effect resination of the pigment particles in the bath, and thereafter recovering the resinated particles of pigment dye.

10. A pigment dyestuff of high tinctorial strength and clean color and capable of maintaining said strength and color substantially undiminished under adverse conditions equivalent to heating to 65° C. for two weeks or storage for periods as long as six months, said pigment comprising particles prepared by substantially immediate coupling of an azo component with a methylenic type coupling component each introduced as a solution into a reaction bath maintained at a pH below about 5.0 throughout the coupling reaction with the introducing of the coupling components into the bath maintained at a low rate controlled to give equivalent reacting proportions in intimate reacting relationship, and resinated against objectionable change under said adverse conditions by treating the reacted mass of the bath after completion of the reaction with the pH raised to about 6.5 with an alkaline resinous solution and a precipitant for said resinous material in solution to effect protective resination of the pigment particles while in substantially their originally produced condition.

11. A pigment dyestuff of high tinctorial strength and clean color when formed, said pigment dyestuff comprising particles prepared by coupling an azotized component with a methylenic type coupling component with said articles formed by substantially complete inter-reaction of a solution of an azo component with a solution of a methylenic coupling component with said particles formed by a substantially instantaneous reaction of said solution components admixed in a reaction bath maintained at a pH below about 5.0 in substantially equimolecular proportions under intimate reaction conditions to produce coupling reaction forming the pigment particles without the presence of unreacted or extraneous materials.

12. The method of preparing a pigment dyestuff of high tinctorial strength and capable of maintaining said strength substantially undiminished under adverse conditions equivalent to heating to 65° C. or more for two weeks or storage for periods as long as six months, which comprises preparing solutions of an azo component and of a methylenic developer component of relatively controlled reacting proportions, preparing a reaction bath in volume controlled according to the amount of components to be added thereto and comprising an aqueous acid solution buffered to maintain a pH below about 5.0 throughout the coupling reactions, simultaneously introducing azo solution and developer solution into said reaction bath to reactively admix said solution components in substantially equimolecular proportions under conditions insuring intimacy of complete reaction until completion of reaction, thereafter raising the temperature of the reaction bath to approximately 60-65° C., thereafter raising the pH in the bath with its contained coupled material to about 6.5 and having added thereto as a protective assistant a relatively minor proportion of alumina hydrate adding a resin solution and a precipitant to effect resination of the pigment particles, and thereafter recovering the resinated particles of pigment dyestuff.

13. The method of producing a pigment by coupling an azo compound with a methylenic coupling component which comprises feeding the two components each in solution simultaneously into a reaction bath in controlled reacting proportions maintaining a controlled low concentration of the reactants in the bath during the reaction, maintaining the reaction bath at a pH below about 5.0, and effecting and maintaining intimate reacting relationship of the reactants in the bath to cause substantially complete reaction of the solution components, and concomitantly controlling said coupling reactions in said bath to prevent interfering precipitation or reaction of either component during the reaction period.

14. The method of producing a pigment by coupling an azotized component with acetoacetanilid which comprises preparing solutions of the components feeding the solutions of components simultaneously into a reaction bath in controlled reacting proportions maintaining a controlled low concentration of the reactants in the bath during the reaction and maintaining the bath throughout the coupling at a pH below about 5.0, effecting substantially complete inter-reaction of the coupling components within said bath and concomitantly controlling the coupling reactions within the bath to prevent interfering precipitation or reaction of either component during the entire inter-reaction of the components.

THEODORE A. LANGSTROTH.